United States Patent [19]

Hergenrother et al.

[11] 4,242,492
[45] Dec. 30, 1980

[54] POLYPHOSPHAZENE POLYMERS CONTAINING SUBSTITUTED OR UNSUBSTITUTED NITROPHENOXY SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,119

[22] Filed: Sep. 8, 1978

[51] Int. Cl.³ .............................................. C08G 83/00
[52] U.S. Cl. ...................................... 528/168; 528/399
[58] Field of Search ................................ 528/399, 168

[56] References Cited

U.S. PATENT DOCUMENTS

| | | | |
|---|---|---|---|
| 3,370,020 | 2/1968 | Allcock et al. | 528/399 |
| 3,844,983 | 10/1974 | Reynard et al. | 528/399 |
| 4,040,843 | 8/1977 | Franko-Filipasic | 106/15 FP |

FOREIGN PATENT DOCUMENTS 2712542  9/1977  Fed. Rep. of Germany ........... 528/399

*Primary Examiner*—Wilbert J. Briggs, Sr.

[57] ABSTRACT

Polyphosphazene polymers are prepared which contain randomly distributed units represented by the formulas:

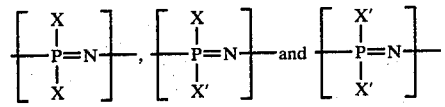

wherein X is selected from the group consisting of substituted and unsubstituted mono, di, and tri nitro substituted phenoxy groups and mixtures thereof and wherein X' is the same as X or is selected from the group consisting of substituted and unsubstituted alkoxy, alkenyloxy, aryloxy, alkenylaryloxy, amino and mercapto groups.

The polymers of the invention can be utilized to form protective films and may also be utilized in application such as for moldings, coatings, and the like where heat stability and solvent resistance are important.

8 Claims, No Drawings

POLYPHOSPHAZENE POLYMERS CONTAINING SUBSTITUTED OR UNSUBSTITUTED NITROPHENOXY SUBSTITUENTS

BACKGROUND OF THE INVENTION

This invention relates to polyphosphazene polymers containing repeating

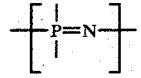

units in the polymer chain in which substituted and unsubstituted nitrophenoxy substituents are attached to the phosphorus atom. More particularly, the invention relates to polyphosphazene polymers having substituents derived from nitrophenols attached to the phosphorus atom, and substituent mixtures of nitrophenol substituents and substituted or unsubstituted aliphatic or aromatic alcohols, amino compounds and mercaptan compounds, and to a method of preparing such polymers.

Polyphosphazene polymers containing repeating

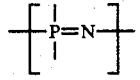

units in which various alkoxy, substituted alkoxy, aryloxy and substituted aryloxy groups are attached to the phosphorus atom and their method of preparation are described in the prior art as illustrated in the publication "Phosphorus Nitrogen Compounds", Academic Press, New York, N.Y. 1972 by H. R. Allcock and "Poly(Organophosphazenes)", Chemtech, Sept. 19, 1975 by H. R. Allcock and in such U.S. Pat. Nos. as 3,515,688; 3,702,833; and 3,856,712.

U.S. patent application Ser. No., 796,073, filed May 12, 1977 now abandoned (commonly assigned) discloses a sodium process using p-nitrophenol. Due to the reaction media (sodium process) and the nature of the product (a yellow material where this application yields a white or clear product), it is believed this disclosure does not yield a polyphosphazene polymer with the nitrophenoxy substituent. It is believed the product of this prior disclosure is some reduced form or condensed form of the nitro group. Also, the sodium process would not permit the high levels of nitrophenoxy substituent in the polyphosphazene that are obtained by this invention. The prior disclosure would yield, due to the sodium process, phenoxy substituents of less than 5 percent (3 percent actually yielded) whereas this invention yields at least 10 mole percent and preferably over 20 mole percent of the nitrophenoxy substituent on the polyphosphazene.

SUMMARY OF THE INVENTION

In accordance with this invention, novel polyphosphazene polymers containing substituted or unsubstituted nitrophenoxy substituents attached to the phosphorus atom and substituent mixtures containing nitrophenoxy substituents and substituted and unsubstituted alkoxy, alkenyloxy, aryloxy, alkenylaryloxy, amino and mercapto substituents attached to the phosphorus atom are prepared.

The polyphosphazene polymers of this invention contain randomly distributed units represented by the formulas:

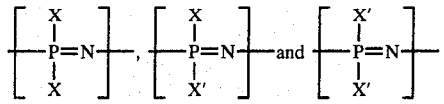

wherein X is selected from the group consisting of substituted and unsubstituted mono, di, and tri nitro substituted phenoxy groups and mixtures thereof, and wherein X' is the same as X or is selected from the group consisting of substituted and unsubstituted alkoxy, alkenyloxy, aryloxy, alkenylaryloxy, amino and mercapto groups.

In the polymer units represented by the above formulas, all X substituent groups may be the same or they may be mixed, all X' substituent groups may be the same or mixed, and all X and X' substituents may be the same. In the mixtures, the X substituent groups may be mixtures of different nitrophenoxy groups and the X' substituent groups may be mixtures of different alkoxy, alkenyloxy, aryloxy, alkenylaryloxy, amino and mercapto groups or mixtures within each group.

The polymers of the invention can be utilized to form protective films and may also be utilized in applications such as for moldings, coatings, and the like where heat stability and solvent resistance are important.

The specific proportion of X to X' substituent groups incorporated in the polymers of the invention may vary considerably depending upon chemical and physical properties desired in the polymer and the particular end use application for which the polymer is intended. Thus, for applications such as moldings, coatings, foams and the like, the polymer should contain at least ten (10) mole percent of the X substituent and preferably it should be greater than 20 mole percent.

DETAILED DESCRIPTION OF THE INVENTION

The term "polymer" as used hereinafter throughout this specification and claims is employed in the broad sense and includes homopolymers, copolymers, terpolymers, tetrapolymers and the like.

As indicated above, the polyphosphazene polymers of this invention are prepared by reacting a poly(dichlorophosphazene) polymer having the structure —(NPCl$_2$)$_n$—, in which n is from 20 to 50,000 with a nitrophenol in the presence of a tertiary amine, or with a substituent mixture of a nitrophenol and a substituted or unsubstituted aliphatic or aromatic alcohol, an amino compound or a mercaptan compound in the presence of a tertiary amine.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171 and 4,055,520 and the aforementioned publications of H. R. Allcock, the disclosures of which are incorporated herein by reference.

These polymers have the general formula —(NPCl$_2$)$_n$—, in which n may range from 20 to 50,000 or more.

As described in the aforementioned references, the polymers are in general prepared by the thermal polymerization of cyclic oligomers having the formula $-(NPCl_2)_n-$, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about $10^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. SUBSTITUENTS

Nitrophenols which may be employed in producing the polymers of the invention are the substituted and unsubstituted mono, di, and tri nitro substituted phenols; specifically, the unsubstituted mono nitrophenols wherein the nitro group is located at the ortho, meta or para position. It is understood that the para and ortho positions are preferred and the meta position is not as reactive. Illustrative examples of the unsubstituted nitrophenols which may suitably be employed are mono nitrophenols, such as para nitrophenol, meta nitrophenol and ortho nitrophenol, dinitrophenols, such as 2,4 dinitrophenol and the like, and trinitrophenols, such as 2,4,6 trinitrophenol and the like.

A preferred unsubstituted nitrophenol for use in preparing the polymers of the invention is p-nitrophenol.

Substituted nitrophenols may also be suitably employed in this invention wherein the substituted groups consist of an alkyl or halogen group or combinations thereof if more than one group is substituted. Illustrative examples of the substituted nitrophenols are 4-methyl, 2-nitrophenol and 2-chloro, 4-nitrophenol and the like.

Preferred substituted nitrophenols for use in preparing polymers of this invention are alkyl nitrophenols and chloro nitrophenols.

In this invention, the nitrophenol substituent in a copolymer must be present in at least 10 mole percent and preferably greater than 20 mole percent.

As indicated heretofore, the polyphosphazene polymers of the invention in addition to the nitrophenoxy substituent group may contain substituted or unsubstituted alkoxy, alkenyloxy, aryloxy, alkenylaryloxy, amino or mercapto groups.

Substituent groups represented by X' for use in these polymers are:

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4,5,5,6,6,7,7-dodecafluoroheptanol and the like. In instances where it is desired to incorporate mixed X' substituent groups in the polymers, mixtures of the foregoing alcohols may be employed.

The alkenyloxy groups (i.e. oxy radicals of alkenyl compounds) may be derived from unsaturated aliphatic alcohols such as allyl alcohol, 3-butene-1-ol, 2,3,3-fluoropropen-1-ol and the like.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The alkenylaryloxy (i.e. alkenyl-substituted aryloxy) group may be derived from unsaturated aromatic alcohols such as vinylphenols, allylphenols, eugenol, isoeugenol and the like.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

Preferred substituent groups represented by X' are alkoxy, especially fluoroalkoxy, and aryloxy, especially chloroaryloxy.

III. THE TERTIARY AMINE

The use of the tertiary amine minimizes undesirable side reactions and at the same time acts as an effective acid scavenger.

Tertiary amines which may be employed in preparing the polymers of the invention are those represented by the general structure:

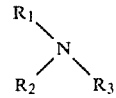

wherein $R_1$, $R_2$, and $R_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo(2.2.2)octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

As indicated above, the polymers of the present invention are prepared by reacting the poly(dichlorophosphazene) polymer and the substituted or unsubstituted nitrophenol, substituent or a substituent mixture of the nitrophenol and the X' substituent as defined above in the presence of a tertiary amine.

The specific reaction conditions and proportion of ingredients employed in preparing these polymers can vary somewhat depending on factors such as the reactivity of the specific nitrophenol substituent utilized, or the substituent mixture of the nitrophenol and the X' substituent, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e. in order to insure the complete conversion of the chlorine atoms in the polymer to the corresponding ester of the nitrophenol.

The above reaction is ordinarily carried out in the presence of a solvent. The solvent employed in the reaction should be a solvent for the poly(dichlorophosphazene) polymer, the nitrophenol, the nitrophenol-X' substituent mixture, and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the nitrophenol or the substituent mixture employed in the process should be at least molecularly equivalent to the number of available chlorine atoms in the polymer mixture. However, if desired, an excess of such compounds may be employed in order to insure substantially complete reaction of all the available chlorine atoms.

The following examples are submitted for the purpose of further illustrating the nature of the present invention and are not intended as a limitation on the scope thereof. Parts and percentages referred to in the examples are by weight unless otherwise indicated.

EXAMPLE 1

Preparation of $[(O_2NC_6H_4O)_2PN]_n$ Polymer

To a 10 ounce beverage bottle was charged 12.24 gms. (88 millimoles) of p-nitrophenol ($O_2NC_6H_4OH$), 100 cc of dry tetrahydrofuran (hereinafter THF), 12.3 cc (88 millimoles) of triethylamine and 36.6 gms. of a 12.67% THF solution of poly(dichlorophosphazene) [4.64 gms., 40.0 millimoles] having a degree of polymerization of about 2600. Upon addition of the poly(dichlorophosphazene) immediate formation of triethylamine hydrochloride and a slight exotherm were noted. After 140 hours in an 80° C., rotary bath no soluble phosphazene linkage could be detected by Infrared spectroscopy. Decanting the resultant polymeric product and washing with water produced 11.8 grams of a tan powder having a peak melting temperature ($T_m$) of 282° C. and a $T_g$ of 59° C.

An analysis of the polymeric product gave: C, 45.45%, H, 2.72%; N, 13.31%; P, 9.14%; Cl, 0.47% (Retest 0.26%). It was calculated that this product contained 1.62% triethylamine hydrochloride. From this, the composition of the polymeric product would have calculated values of: C,45.41%; H, 2.63%; N, 13.15%; P, 9.57%, Cl, 0.43%.

The solid polymer when pressed at 225° C. under a pressure of 2000 psi formed a smooth, clear continuous film.

EXAMPLE II

Preparation of $[(CH_3O_2NC_6H_4O)PN]_n$ Polymer

To a 10 ounce beverage bottle was charged 13.48 gms. (88 millimoles) of 4 methyl-2 nitrophenol ($CH_3O_2NC_6H_4OH$), 100 cc of dry tetrahydrofuran (hereinafter THF), 12.3 cc (88 millimoles) of triethylamine and 13.8 gms. of a 33.9% cyclohexane solution of poly(dichlorophosphazene) 40.3 millimoles, having a degree of polymerization of about 2600. Upon addition of the poly(dichlorophosphazene) a slight exotherm was noted. After 24 hours in a 120° C., rotary bath no soluble phosphazene linkage could be detected by Infrared spectroscopy. 4.0 gms. of the resulting product was isolated by coagulation in methanol and 2.49 gms. of polymer was obtained by methanol washing of the salt.

The solid polymer when pressed at 225° C. under a pressure of 2000 psi formed a smooth, clear continuous film.

EXAMPLE III

Preparation of $[(ClO_2NC_6H_4O)_2PN]_n$ Polymer

To a 10 ounce beverage bottle was charged 15.27 gms. (88 millimoles) of 2 chloro-4 nitrophenol ($ClO_2NC_6H_4OH$), 100 cc of dry tetrahydrofuran (hereinafter THF), 12.3 cc (88 millimoles) of triethylamine and 13.7 gms. of a 33.9% cyclohexane solution of poly(-dichlorophosphazene) (40.0 millimoles) having a degree of polymerization of about 2600. Upon addition of the poly(dichlorophosphazene) a slight exotherm was noted. After 24 hours in a 120° C., rotary bath no soluble phosphazene linkage could be detected by Infrared spectroscopy. After extraction in methanol, 14.1 gms. of a THF insoluble polymeric product was obtained.

The solid polymer when pressed at 225° C. under a pressure of 2000 psi formed a smooth, clear continuous film.

EXAMPLE IV

Preparation of $[(O_2NC_6H_4O)(CF_3CH_2O)PN]_n$ Copolymer

To a 10 ounce beverage bottle was charged 6.12 gms. (44 millimoles) of p-nitrophenol ($O_2NC_6H_4OH$), 100 cc of alcohol free, dry chloroform, 3.2 cc (44 millimoles) of trifluoroethanol, 12.3 cc (88 millimoles) of triethylamine and 55.7 gms. of a 8.35% cyclohexane solution of poly(-dichlorophosphazene) 40.1 millimoles having a degree of polymerization of about 2600. After 20 hrs. in a 120° C. oven, no soluble phosphazene linkage could be detected by Infrared spectroscopy at 600 cm$^{-1}$ and weak substituted phosphazene bands at 550 and 528 cm$^{-1}$. Coagulating and washing with methanol gave 9.7 gms. of a light tan powder.

The solid polymer when pressed at 225° C. under a pressure of 2000 psi formed a smooth, clear continuous film.

EXAMPLE V

Preparation of [(O$_2$NC$_6$H$_4$O) (ClC$_6$H$_4$O)PN]$_n$ Copolymer

To a 10 ounce beverage bottle was charged 6.12 gms. (44 millimoles) of p-nitrophenol (O$_2$NC$_6$H$_4$OH), 100 cc of alcohol free, dry chloroform, 5.66 gms. (44 millimoles) of p-chlorophenol, 12.3 cc (88 millimoles) of triethylamine and 64.0 gms. of a 7.26% chloroform solution of poly(dichlorophosphazene) 40.1 millimoles having a degree of polymerization of about 2600.

The bottle was heated for 68 hrs. in a 120° C. oven and contained the insoluble polymeric phosphazene derivative. Washing with methanol removed the excess phenols and any triethylamine hydrochloride. A total of 11.0 gms. of an off-white plastic was obtained. The solid polymer was pressed at 225° C. under 2000 psi pressure to yield a clear, tough film.

We claim:

1. A method of preparing polyphosphazene polymers consisting of units represented by the formulas:

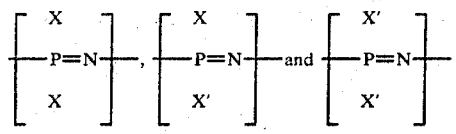

wherein X is selected from the group consisting of substituted and unsubstituted mono, di, and tri nitro phenoxy groups or mixtures thereof and wherein X' is the same as X or is selected from the group consisting of substituted and unsubstituted alkoxy, alkenyloxy, aryloxy, alkenylaryloxy, amino and mercapto groups; said method comprising reacting a poly(dichlorophosphazene) polymer having the formula —(NPCl$_2$)$_n$—, wherein n is from 20 to 50,000, with a substituted or unsubstituted mono, di, or tri nitrophenol or a mixture consisting of a substituted or unsubstituted mono, di or tri nitrophenol and a substituted aliphatic or aromatic alcohol, an amino compound or a mercaptan compound in the presence of a tertiary amine.

2. The method of claim 1 wherein X is derived from p-nitrophenol.

3. The method of claim 1 wherein X is derived from 4 methyl-2 nitrophenol.

4. The method of claim 1 wherein X is derived from 2 chloro-4 nitrophenol.

5. The method of claim 1 wherein said mixture consists of p-nitrophenol and trifluoroethanol.

6. The method of claim 1 wherein said mixture consists of p-nitrophenol and p-chlorophenol.

7. The method of claim 1 wherein said tertiary amine is triethylamine.

8. The method of claim 1 wherein said X substituent is at least 10 mole percent.